United States Patent [19]

Takeuchi et al.

[11] Patent Number: 4,706,703
[45] Date of Patent: Nov. 17, 1987

[54] FLUID CONTROL VALVE

[75] Inventors: Kunihiko Takeuchi, Kawasaki; Hiroshi Nogi, Yokohama, both of Japan

[73] Assignee: Tokyo Keiki Company Limited, Tokyo, Japan

[21] Appl. No.: 876,417

[22] Filed: Jun. 20, 1986

[30] Foreign Application Priority Data

Jun. 24, 1985 [JP] Japan .................. 60-135966

[51] Int. Cl.⁴ .................................. F16K 31/02
[52] U.S. Cl. ....................... 137/487.5; 251/129.04; 251/129.05; 455/603
[58] Field of Search ............ 251/129.04, 129.05, 251/129.08; 137/487.5, 468; 455/603

[56] References Cited

U.S. PATENT DOCUMENTS

| | | | |
|---|---|---|---|
| 2,948,295 | 8/1960 | Smith, Jr. | 137/487.5 |
| 3,307,824 | 3/1967 | Weisheit | 251/129.05 |
| 4,306,314 | 12/1981 | Griffiths | 251/129.04 X |
| 4,386,626 | 6/1983 | Hehl | 251/129.08 X |

Primary Examiner—Arnold Rosenthal
Attorney, Agent, or Firm—Fleit, Jacobson, Cohn & Price

[57] ABSTRACT

A linear solenoid-type flow control valve with a valve element position feedback loop. An input consisting of an analog command signal is supplied in the form of a serial digital signal from a modulating transmitter through an optical fiber transmission line. An actuator operating driving circuit, a receiving demodulator for reconverting the light signal from the transmission line to the serial digital signal and further to the analog command signal and supplying it to the driving circuit, a differential transformer for detecting an operated position of a control valve element and a feedback circuit from the differential transformer are integrally mounted on the coupling component of the control valve element and its actuator and in this way the component parts at the receiving side are arranged as close as possible with respect to one another.

2 Claims, 5 Drawing Figures

FLUID CONTROL VALVE

BACKGROUND OF THE INVENTION

The present invention relates to fluid control valves and more particularly to a fluid control valve which is less susceptible to the effect of noise.

In the art of linear solenoid control valves, it has been the known practice to detect the actual position of a movable valve element by a differential transformer and feed the detected position signal back to an electric driving circuit of the control valve thereby improving the control accuracy.

In the past, generally such driving circuit has been mounted in a control panel installed at a remote place from a fluid control valve and the connection between the driving circuit and a solenoid actuator of the fluid control valve is provided by laying long electric wires.

As a result, a driving circuit mounting space must be provided in the control panel thus causing a problem from the standpoint of decreasing the size of the control panel and the wiring operation requires much time and labor since it is necessary to lay as the connection wires several kinds of electric wires including a pair of actuator driving wires, a pair of feedback wires, a pair of differential transformer operating wires, etc. Also, if the wires are increased in length, external noise tends to enter the connection wires of the differential transformer and this tends to cause erroneous operations.

SUMMARY OF THE INVENTION

The present invention has been made to overcome the foregoing deficiencies in the prior art and it is the primary object of the invention to provide a fluid control valve which is small in size and not susceptible to the effect of noise.

In accordance with one aspect of the invention, a fluid control valve includes a driving circuit for generating a drive signal corresponding to an analog command signal indicative of a flow rate or fluid pressure, an actuator adapted to be operated by the drive signal, a control valve element operable in response to the operation of the actuator, a position sensor for detecting the output position of the actuator and a feedback circuit responsive to the actuator output position detected by the position sensor to control the drive signal so as to attain the flow rate or fluid pressure indicated by the command signal as well as a modulating transmitter for converting the analog command signal to a serial digital signal and converting the serial digital signal to a light signal, a transmission line consisting of an optical fiber cable for transmitting the light signal and a receiving demodulator for reconverting the light signal to the serial digital signal, reconverting the serial digital signal to the analog command signal and supplying it to the driving circuit, and the fluid control valve features that the receiving demodulator, the driving circuit, the actuator, the control valve element, the position sensor and the feedback circuit are integrally mounted so as to reduce as far as possible the distance between the driving circuit and the actuator, between the position sensor and the feedback circuit and between the feedback circuit and the driving circuit, respectively.

The fluid control valve may further include a thermosensor for detecting the temperature of the control valve element or the working oil of the control valve and in this case the driving circuit includes another feedback circuit responsive to the detected temperature to adjust the drive signal and thereby effect the desired temperature compensation of the control valve.

In accordance with the invention, by virtue of the provision of a modulating transmitter for converting an analog command signal indicative of a flow rate or fluid pressure to a serial digital signal and converting the serial digital signal to a light signal, a transmission line comprising an optical fiber cable for transmitting the light signal and a receiving demodulator for reconverting the light signal to the serial digital signal and reconverting the serial digital signal to the analog command signal and the integral mounting of a receiving demodulator, a driving circuit for generating a drive signal corresponding to the analog command signal, an actuator adapted to be operated by the drive signal, a control valve element operable in response to the operation of the actuator, a position sensor for detecting an actuator output position and a feedback circuit for controlling the drive signal in accordance with the detected position of the actuator thereby reducing as far as possible the distance between the driving circuit and the actuator, between the position sensor and the feedback circuit and between the feedback circuit and the driving circuit, respectively, it is possible to obtain a fluid control valve which is small in size and less susceptible to the effect of noise.

Further, the signal lines for the actuator drive current, position sensor drive signal, position sensor position detection signal, etc., are reduced considerably making it possible to provide them as an internal wiring, with the result that there is no need to lay and extend these signal lines and the working efficiency of the system construction is improved.

The above and other objects as well as advantageous features of the invention will become more clear from the following description taken in conjunction with the drawings.

DESCRIPTION OF THE PREFERRED EMBODIMENTS

Before describing preferred embodiments of the invention, a known fluid control valve will be described with reference to FIG. 5 for facilitating the understanding of the invention.

Figure 5:
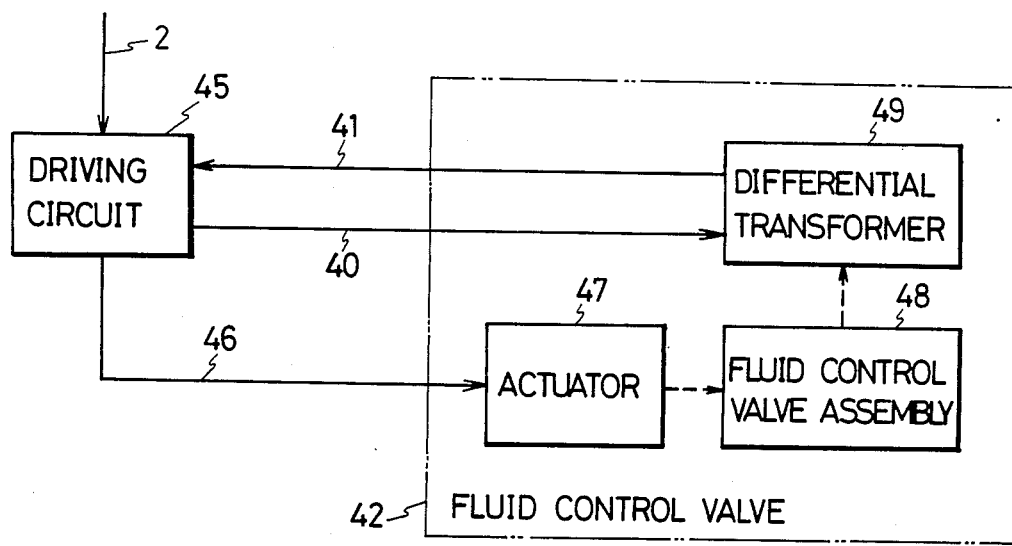
FIG. 5 is a block diagram of a conventional fluid control valve.

In the past, there has been known a fluid control valve of the above type as shown by the block diagram of FIG. 5. FIG. 5 shows a so-called hydraulic-pneumatic linear valve and its driving circuit. In response to the application of an analog command signal 2 indicative of a flow rate or fluid pressure, a drive signal 46 is generated from a driving circuit 45 which is mounted separately from a fluid control valve 42 and the drive signal 46 operates an actuator 47 which in turn actuates the spool (not shown) of a fluid control valve assembly 48.

On the other hand, a differential transformer 49 for detecting the operated position of the actuator 47 or the position of the spool of the fluid control valve assembly 48, is operated by a drive signal 40 generated from the driving circuit 45 to generate a position detection signal 41 corresponding to the spool position of the fluid control valve assembly 48. When the position detection signal 41 is fed back to the driving circuit 45, the control circuit included in the driving circuit 45 adjusts the magnitude of the drive signal 46 in such a manner that a position detection signal 41 to be fed back attains a value corresponding to the flow rate or fluid pressure indicated by the analog command signal 2.

However, this type of conventional fluid control valve is disadvantageous in that since the driving circuit 45 and the fluid control valve 42 are arranged separately from each other and the driving circuit 45 is mounted within the control panel or the like, a large space must be provided within the control panel or the like thus increasing the size of the system.

Another disadvantage is that it is necessary to extend the signal lines for different kinds of signals such as the drive signal 40 for the differential transformer 49 and the position detection signal 41 and the working efficiency of the wiring is deteriorated.

Still another disadvantage is that since the differential tranformer 49 generating the position detection signal 41 in response to the drive signal 40 is high in both the input and output impedances, if the distance between the driving circuit 45 and the fluid control valve assembly 48 is long, external noise enters the position detection signal 41 and an error is caused in the position detection.

An embodiment of the invention will now be described with reference to the accompanying drawings.

Figure 1:
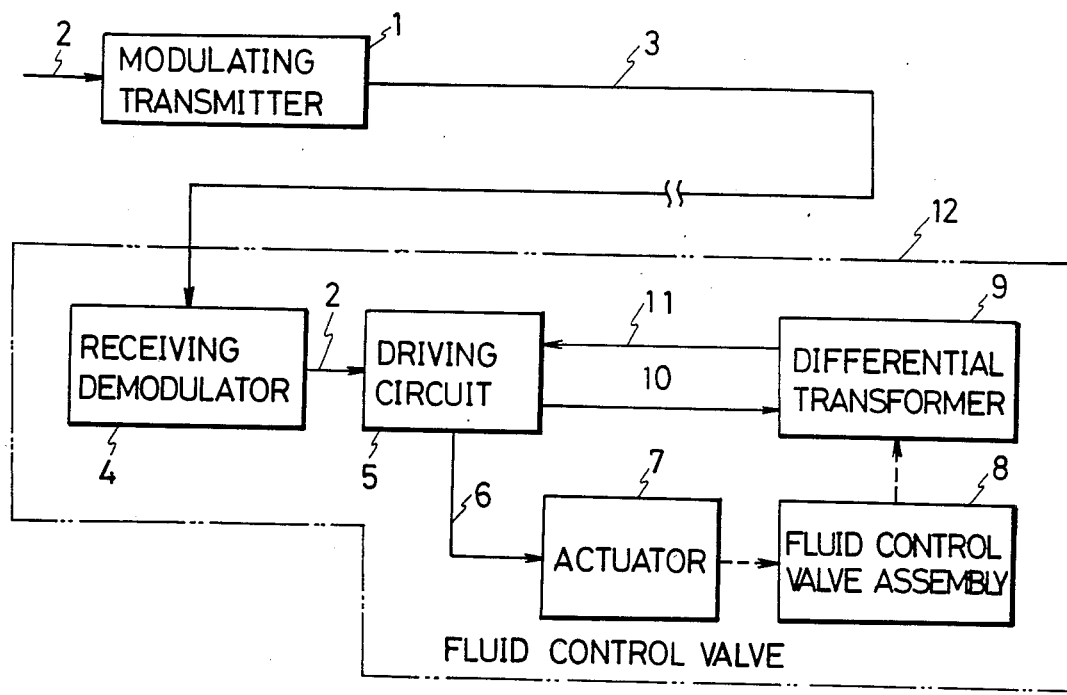
FIG. 1 is a block diagram of a fluid control valve according to an embodiment of the invention.
Figure 2:
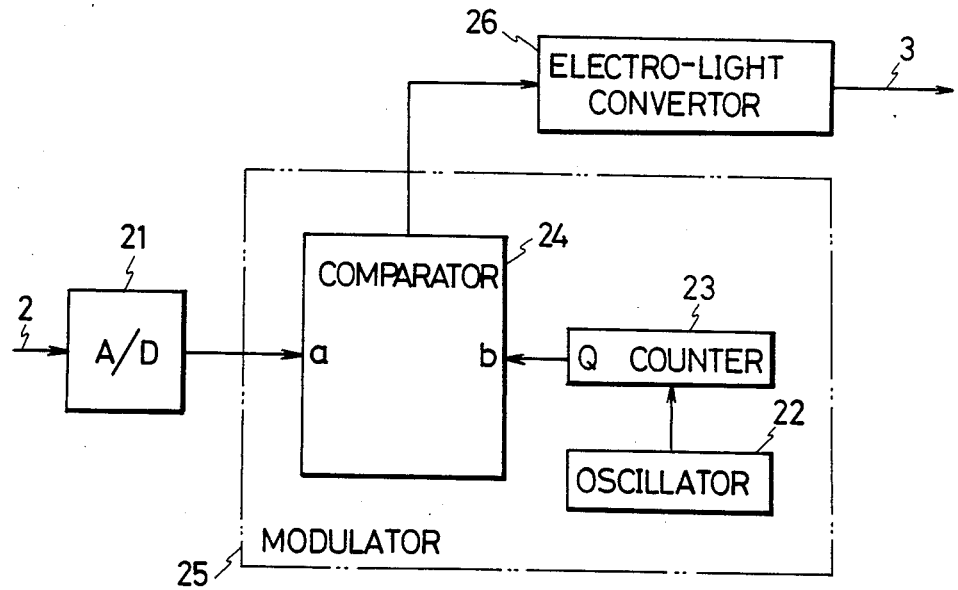
FIGS. 2 and 3 are block diagrams showing respectively the modulating transmitter and the receiving demodulator of FIG. 1.

FIG. 1 is a block diagram of a fluid control valve according to the invention. In the Figure, numeral 1 designates a modulating transmitter for converting an analog command signal 2 to a serial digital signal, subjecting the serial digital signal to the process of pulse-duration modulation and converting the modulated signal to a light signal. FIG. 2 is a block diagram of the modulating transmitter 1. The modulating transmitter 1 includes an A/D converter 21 for converting the analog command signal 2 to a serial digital signal, a modulator 25 for subjecting the serial digital signal to the process of pulse-duration modulation, and an electro-light convertor 26 for converting the pulse-duration modulated serial digital signal to a light signal. The modulator 25 includes a pulse oscillator 22, a counter 23 and a digital comparator 24.

The pulse oscillator 22 generates clock signals having a given frequency and applies them to the counter 23. The counter 23 counts the applied clock signals at all times and it repeat the counting from the beginning each time the count reaches a given value. The count of the counter 23 is applied as a Q to one input terminal b of the digital comparator 24. The number of digits and positions of the counter 23 is selected equal to the number of positions in the transmitted serial digital signal. The serial digital signal from the A/D convertor 21 is applied to the other input terminal a of the digital comparator 24 and the value A of the serial digital signal at the input terminal a is compared with the count value B of the counter 23 at the input terminal b by the digital comparator 24. For example, if the result is A>B, a positive voltage corresponding to the "High" level of the logical values is generated from the digital comparator 24, whereas if A≦B, a zero voltage corresponding to the "Low" level of the logical values is generated.

Figure 3:
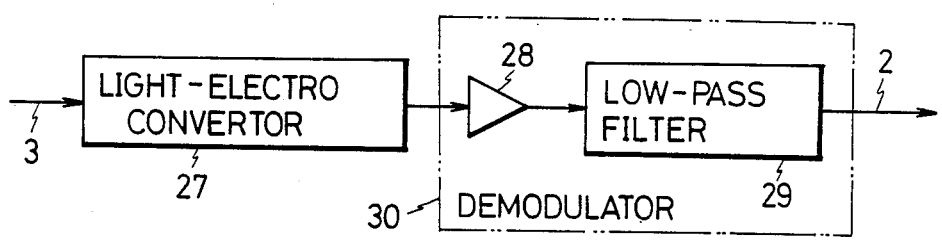

Numeral 3 designates a transmission line comprising an optical fiber cable, and 4 a receiving demodulator for reconverting the light signal to the pulse-modulated serial digital signal and reconverting the pulse-modulated serial digital signal to the analog command signal. FIG. 3 is a block diagram of the receiving demodulator 4. The receiving demodulator 4 includes a light-electro convertor 27 for reconverting the light signal to the serial digital signal and a demodulator 30 for reconverting the serial digital signal to the analog command signal 2. The demodulator 30 includes a receiving buffer amplifier 28 and a low-pass filter 29. The output of the receiving buffer amplifier 28 is connected to the low-pass filter 29 thereby obtaining the analog command signal 2.

Numeral 5 designates a driving circuit for generating a drive signal 6 corresponding to the analog command signal 2, 7 an actuator operated by the drive signal 6, 8 a fluid control valve assembly operable in response to the operation of the actuator 7, and 9 a differential transformer (position sensor) operated by a drive signal 10 generated from the driving circuit 5 to generate a position detection signal 11 corresponding to the opened or closed position of the fluid control valve as a feedback signal. A fluid control valve unit 12 comprises the actuator 7, the fluid control valve assembly 8 and the differential transformer 9 and thus the receiving demodulator 4 and the driving circuit 5 (including the feedback circuit of the signal 11) are integrally mounted on the former. The driving circuit 5 includes a control circuit responsive to the position detection signal 11 to control the drive signal so as to attain the flow rate or fluid pressure indicated by the analog command signal 2.

With the fluid control valve according to the invention, the driving circuit 5 is integral with the fluid control valve so that the signal lines of the differential transformer drive signal and the position detection signal are short and the entry of external noise is difficult as compared with the conventional valve shown in FIG. 5.

Also, since the analog command signal 2 is applied to the driving circuit 5 through the optical fiber cable 3 which is not subject to the effect of noise, the fluid control valve can be remote controlled from a distance of more than several km.

While, in this embodiment, an analog command signal 2 is transmitted by first subjecting it to the process of pulse duration modulation and then converting it to a light signal thereby eliminating the effect of noise, the same effect can be obtained by the process of pulse-frequency modulation. The pulse-frequency modulated analog command signal 2 may be demodulated by a demodulator such as a F - V (frequency-voltage) convertor.

Next, the overall operation of the fluid control valve according to the invention will be described. Firstly, when the analog command signal 2 is applied, the modulating transmitter 1 converts it to a serial digital signal and then to a light signal and this light signal is delivered to the transmission line 3. Then, the receiving demodulator 4 receives the light signal generated from the modulating transmitter 1 so that the light signal is reconverted to the pulse-modulated serial digital signal and then to serial digital signal is reconverted to the analog command signal 2. The driving signal 5 applies to the actuator 7 a drive signal 6 corresponding to the analog command signal 2 so that the actuator 7 is operated and the spool of the fluid control valve assembly 8 is moved. When the position of the spool is detected by the differential transformer 9, the driving circuit 5 adjusts its drive signal 6 in such a manner that a feedback signal attains a value corresponding to the flow rate or fluid pressure indicated by the analog command signal 2.

Figure 4:
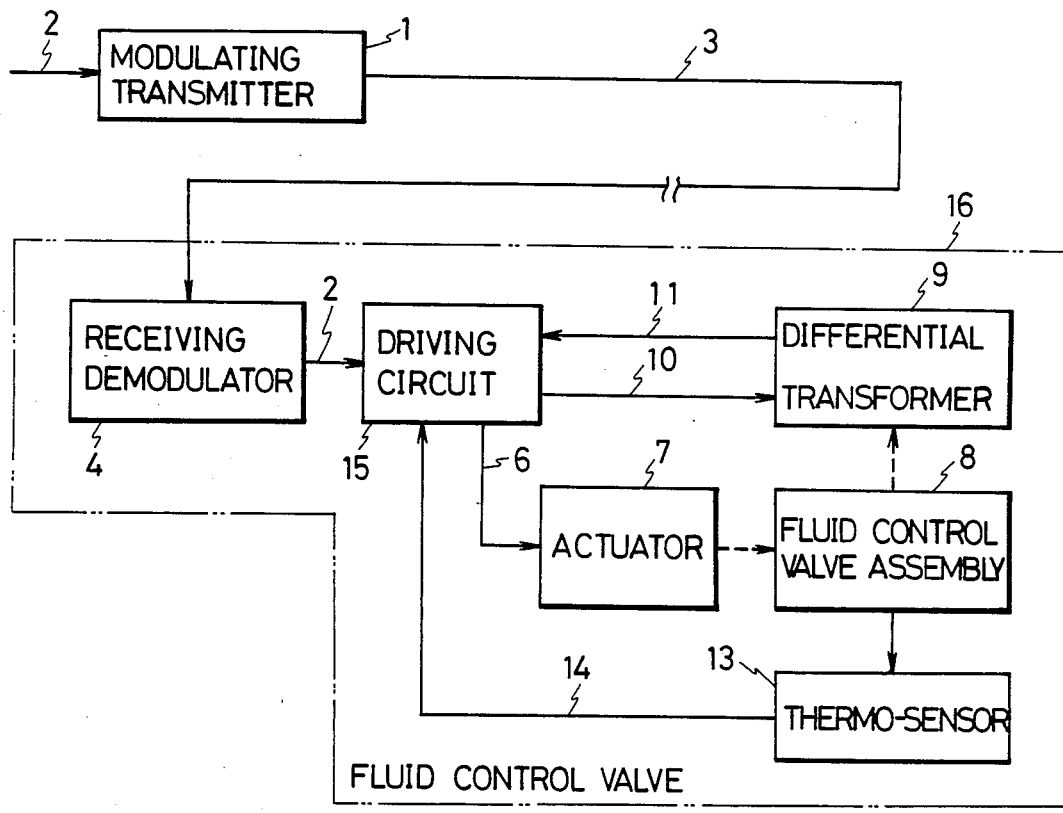
FIG. 4 is a block diagram showing another embodiment of the fluid control valve according to the invention.

Referring now to FIG. 4, there is illustrated a block diagram showing another embodiment of the fluid control valve according to the invention. In the Figure, the component parts performing the same functions as in FIG. 1 are designated by the same reference numerals and will not be described.

Generally, a linear control valve is subject to changes in the flow rate and pressure caused by variations in the viscosity of the working fluid with temperature, expansion of the valve element, etc. Thus, in accordance with the present embodiment, a thermo-sensor 13 consisting of a thermister, temperature indicating resistor, thermocouple or the like is used to detect the temperature of the fluid control valve mechanism 8 or the working oil and this makes possible the provision of temperature drift compensation. In the past, it has been impossible to use the thermo-sensor 13 due to its high input and output impedance or its low output voltage. When a detected temperature signal 14 corresponding to the temperature measured by the thermo-sensor 13 is applied to a driving circuit 15, the driving circuit 15 compensates to eliminate any flow rate or pressure variation due to temperature changes in accordance with changes in the viscosity of the working oil or the structure of the valve.

We claim:

1. In a fluid control valve including a driving circuit for generating a drive signal corresponding to an analog command signal indicative of a flow rate or fluid pressure, an actuator adapted to be operated by said drive signal, a control valve element operable in response to the operation of said actuator, a position sensor for detecting an output position of said actuator, and a feedback circuit responsive to said actuator output position detected by said position sensor to control said drive signal so as to attain said flow rate or fluid pressure indicated by said command signal, the improvement comprising:

a modulating transmitter for converting said analog command signal to a serial digital signal and converting said serial digital signal to a light signal;

a transmission line including an optical fiber cable for transmitting said light signal; and a receiving demodulator for reconverting said light signal to said serial digital signal, reconverting said serial digital signal to said analog comand signal and supplying said analog command signal to said driving circuit;

whereby said receiving demodulator, said driving circuit, said actuator, said control valve element, said position sensor and said feedback circuit are mounted integrally thereby arranging close to each other said driving circuit and said actuator, said position sensor and said feedback circuit and said feedback circuit and said driving circuit, respectively, wherein said modulating transmitter includes an analog-digital converter for converting said analog command signal to said serial digital signal, a modulator for pulse-duration modulating or pulse-frequency modulating said serial digital signal, and an electro-light convertor for converitng the output signal of said modulator to said light signal, wherein said modulator includes a pulse oscillator for generating clock pulses having a predetermined frequency, a counter for repeating counting of said clock pulses with the same number of positions as a serial digital signal to be transmitted, and a digital comparator for applying to said electro-light convertor a data indicative of a comparison between a serial digital data and a count of said counter, and wherein said receiving demodulator includes a light-electro convertor for converting said light signal from said transmission line to said serial digital signal, and a low-pass filter for demodulating said analog command signal from said serial digital signal generated from said light-electro convertor.

2. A fluid control valve according to claim 1, further comprising a thermo-sensor for detecting a temperature of said control valve element or a working oil thereof, and wherein said driving circuit includes another feedback circuit for controlling said drive signal in accordance with said detected temperature.

* * * * *